(12) United States Patent
Chen et al.

(10) Patent No.: US 11,977,437 B2
(45) Date of Patent: May 7, 2024

(54) DYNAMIC ADJUSTMENT OF LOG LEVEL OF MICROSERVICES IN HCI ENVIRONMENT

(71) Applicant: Dell Products L.P., Round Rock, TX (US)

(72) Inventors: Kai Chen, Shanghai (CN); Bo Wang, Shanghai (CN); Carl Shi, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/962,892

(22) Filed: Oct. 10, 2022

(65) Prior Publication Data

US 2024/0103954 A1    Mar. 28, 2024

(30) Foreign Application Priority Data

Sep. 23, 2022   (CN) .......................... 202211177609.7

(51) Int. Cl.
  *G06F 11/00*   (2006.01)
  *G06F 11/07*   (2006.01)

(52) U.S. Cl.
  CPC ...... *G06F 11/0781* (2013.01); *G06F 11/0721* (2013.01); *G06F 11/0757* (2013.01)

(58) Field of Classification Search
  CPC ............. G06F 11/0781; G06F 11/0721; G06F 11/0757

USPC .......................................................... 714/1–57
See application file for complete search history.

(56) References Cited

U.S. PATENT DOCUMENTS

| | | | |
|---|---|---|---|
| 11,561,849 B1* | 1/2023 | Kairali | G06F 11/079 |
| 11,726,850 B2* | 8/2023 | Colgrove | G06F 11/0727 |
| | | | 714/45 |
| 2005/0015667 A1* | 1/2005 | Aaron | G06F 21/577 |
| | | | 714/25 |
| 2015/0143182 A1* | 5/2015 | Rajamanickam | G06F 11/0781 |
| | | | 714/48 |
| 2017/0242784 A1* | 8/2017 | Heorhiadi | G06F 11/3684 |
| 2018/0232256 A1* | 8/2018 | Chaganti | G06F 9/5061 |
| 2021/0117263 A1* | 4/2021 | Dunne | G06F 11/3065 |

* cited by examiner

*Primary Examiner* — Sarai E Butler
(74) *Attorney, Agent, or Firm* — Jackson Walker L.L.P.

(57) ABSTRACT

An information handling system may include at least one processor and a memory. The information handling system may be configured to: execute a plurality of microservices, wherein each microservice is configured to generate logging information relating to its operation, and wherein a logging level is configured to determine an amount of logging information generated by the microservice; monitor the execution of the plurality of microservices to determine a failure rate associated with application programming interface (API) calls to the plurality of microservices; and based on the determined failure rate, alter the logging level.

15 Claims, 2 Drawing Sheets

DYNAMIC ADJUSTMENT OF LOG LEVEL OF MICROSERVICES IN HCI ENVIRONMENT

TECHNICAL FIELD

The present disclosure relates in general to information handling systems, and more particularly to techniques for logging.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware© vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

Some HCI systems are used to host microservices. A microservice architecture refers generally to an application that is implemented as a collection of loosely coupled services that provide APIs for communication with one another.

The business dependencies among components in a microservice architecture create a complicated system, and appropriate logging of errors and other events provides important insights into operational details. However, it can be difficult to ensure that an appropriate level of logging is used.

The logging level refers to the amount and type of data that is logged. For example, at a low logging level, only critical errors may be logged. At a higher logging level, any errors and warnings may be logged. At a still higher logging level, errors, warnings, and events may be logged. In general, a logging system may be configurable with any desired number of logging levels.

Insufficient logging omits important information, but generating too many logs can lead to excessive I/O and processor usage, as well as burying the important information in the unimportant information. Accordingly, embodiments of this disclosure provide improved logging, which may be used in HCI microservice systems as well as other systems.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with logging may be reduced or eliminated.

In accordance with embodiments of the present disclosure, an information handling system may include at least one processor and a memory. The information handling system may be configured to: execute a plurality of microservices, wherein each microservice is configured to generate logging information relating to its operation, and wherein a logging level is configured to determine an amount of logging information generated by the microservice; monitor the execution of the plurality of microservices to determine a failure rate associated with application programming interface (API) calls to the plurality of microservices; and based on the determined failure rate, alter the logging level.

In accordance with these and other embodiments of the present disclosure, a method may include executing a plurality of microservices at an information handling system, wherein each microservice is configured to generate logging information relating to its operation, and wherein a logging level is configured to determine an amount of logging information generated by the microservice; monitoring the execution of the plurality of microservices to determine a failure rate associated with application programming interface (API) calls to the plurality of microservices; and based on the determined failure rate, altering the logging level.

In accordance with these and other embodiments of the present disclosure, an article of manufacture may include a non-transitory, computer-readable medium having computer-executable instructions thereon that are executable by a processor of an information handling system for: executing a plurality of microservices, wherein each microservice is configured to generate logging information relating to its operation, and wherein a logging level is configured to determine an amount of logging information generated by the microservice; monitoring the execution of the plurality of microservices to determine a failure rate associated with application programming interface (API) calls to the plurality of microservices; and based on the determined failure rate, altering the logging level.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
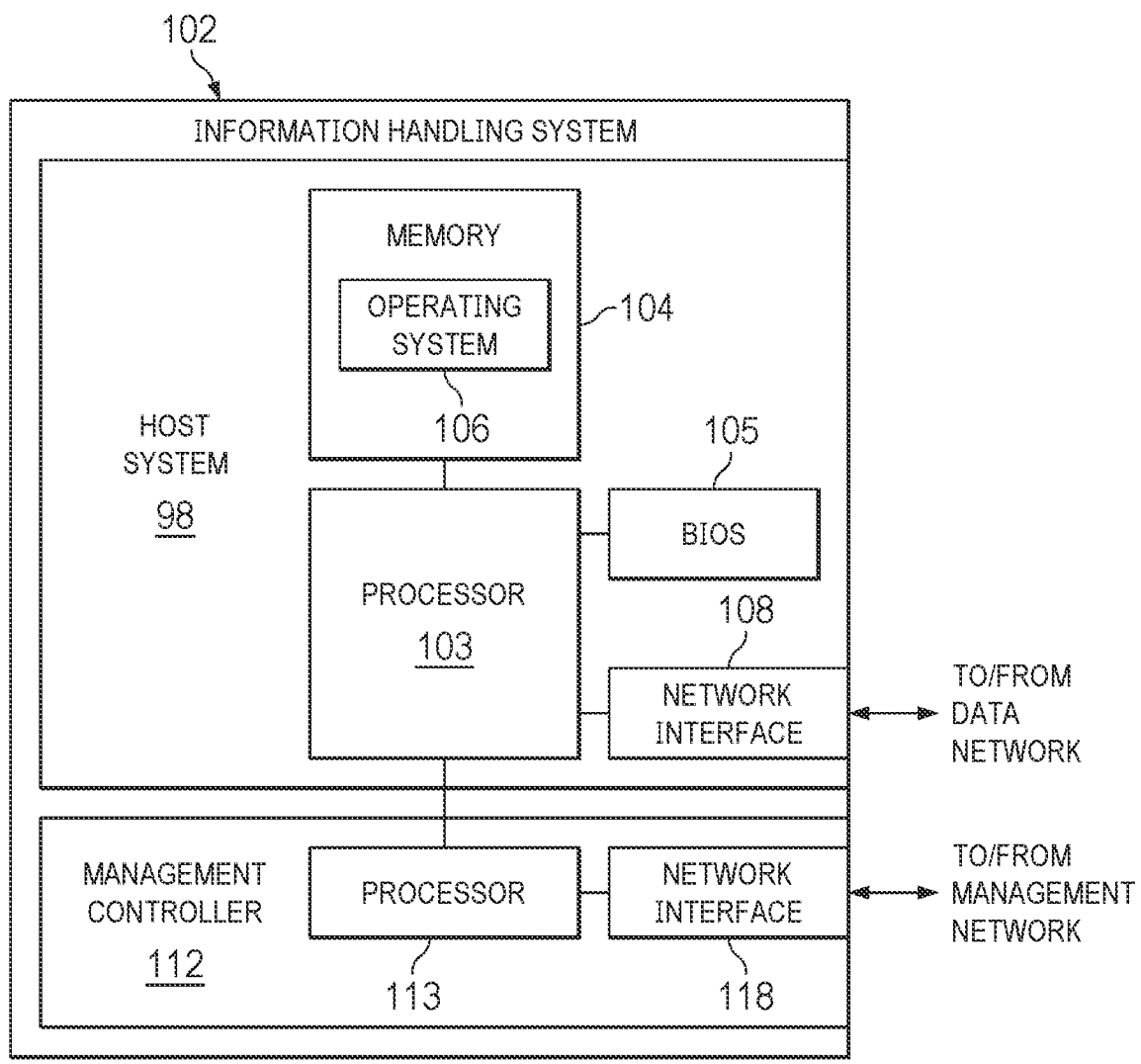
FIG. 1 illustrates a block diagram of an example information handling system, in accordance with embodiments of the present disclosure.
Figure 2:
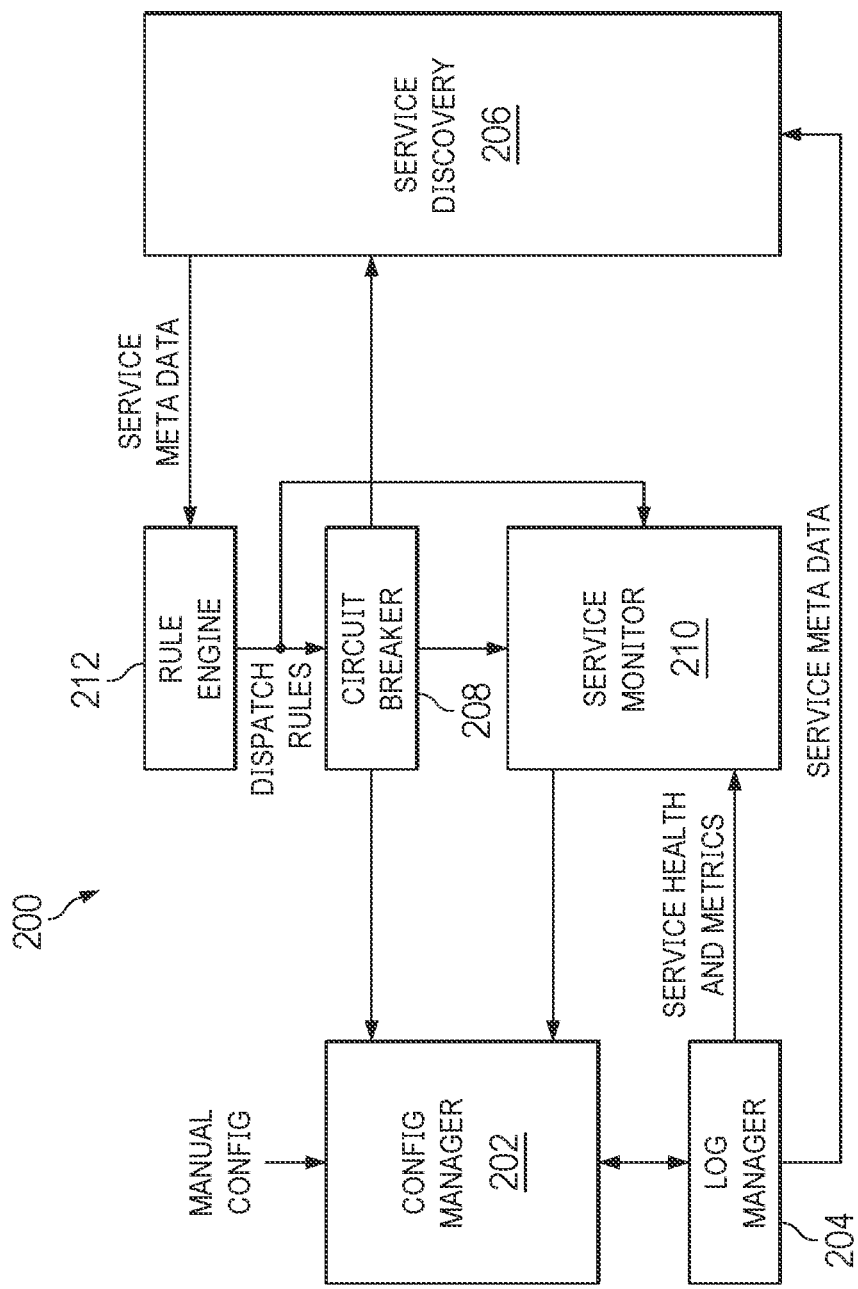
FIG. 2 illustrates a block diagram of an example logging architecture, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in logging. According to one embodiment, a logging level may be proactively adjusted in a microservice platform as a whole or in individual services thereof. The adjustments may be made based on system status, configurable rules, etc. In one embodiment, the logging level may also be manually set (e.g., for debugging or support purposes).

Turning now to FIG. 2, an example architecture 200 is shown for dynamic adjustment of microservice log levels, according to some embodiments. Architecture 200 includes several components, which may themselves be implemented as microservices in some embodiments.

Configuration manager 202 is operable to store the current setting of the microservice logging level and receive instructions to change the logging level from other components of architecture 200. Configuration manager 202 may also receive a manual configuration if a user needs to change the logging level.

Log manager 204 may monitor configuration manager 202 for any changes that have been made to the logging level. If any changes are made, log manager 204 may reconfigure services and modules of the microservice platform as necessary to implement the new logging level, causing those components to emit log messages in accordance with the new level.

Service discovery component 206 registers services and metadata for each component of architecture 200.

Circuit breaker 208 may provide a fault-tolerant and resilient system that can behave gracefully when key services are unavailable or have high latency. According to information from rule engine 212 and service monitor 210, circuit breaker 208 may notify configuration manager 202 to change the logging level configuration.

For example, a rule may be defined in rule engine 212 such that if certain percentages of the microservice API calls among the microservices in a selected time window fail, then the logging level may be changed (e.g., increased) and/or other actions may be taken. For example, the rule may define a 30% failure rate as a lower threshold resulting in increased logging, and a 50% failure rate as an upper threshold resulting in disabling a service altogether (which may be referred to as opening the circuit breaker).

In this example, suppose that 30 microservice calls take place within the designated time window. If 9 of those calls fail (e.g., 30% of the calls) then circuit breaker 208 may instruct configuration manager 202 to alter the logging level for the service with the failing calls and/or related components. In this way, additional debugging information may be generated to aid in diagnosing the problem. If 15 of the 30 calls result in timeout exceptions, then the error percentage has reached 50%, and a service may be disabled or restarted, or some other remedial action may be taken.

Service monitor 210 may be used to check service health and monitor service metrics. According to rules from rule engine 212 and the observed service status, service monitor 210 may also notify configuration manager 202 to change the logging level.

Rule engine 212 may set rules for how to change the logging levels in different services. For example, default rules may be provided, and they may be user-configurable as well. Rule engine 212 may dispatch its rules to circuit breaker 208 and service monitor 210.

Accordingly, embodiments of this disclosure allow for different logging levels to be configured by custom rules for services or modules in a microservice platform. The logging level may be dynamically adjusted based on system status (e.g., service call failure rates, hardware status, and any other suitable metrics).

In addition to raising the logging level when problems are detected, embodiments may also dynamically lower the logging level in response to an indication of normal, successful operation.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   execute a plurality of microservices, wherein each microservice is configured to generate logging information relating to its operation, and wherein a logging level is configured to determine an amount of logging information generated by the microservice;
   monitor the execution of the plurality of microservices to determine a failure rate associated with application programming interface (API) calls to the plurality of microservices;
   evaluate one or more rules specifying responses to different failure rates of respective microservices, wherein:
      a first rule specifies increasing a particular logging level associated with a particular microservice in response to a failure rate associated with the particular microservice being above a first threshold; and
      a second rule specifies restarting and/or disabling the particular microservice in response to the failure rate associated with the particular microservice being above a second threshold; and
   based on the evaluation of the one or more rules, alter the logging level.

2. The information handling system of claim 1, wherein the information handling system is a hyper-converged infrastructure (HCI) system.

3. The information handling system of claim 1, further configured to alter the logging level based on a user request for a manual logging level alteration.

4. The information handling system of claim 1, wherein:
   a first logging level corresponds to logging of errors;
   a second logging level corresponds to logging of errors and warnings; and
   a third logging level corresponds to logging of errors, warnings, and events.

5. The information handling system of claim 1, further configured to alter the logging level based on a hardware status of the information handling system.

6. A method comprising:
   executing a plurality of microservices at an information handling system, wherein each microservice is configured to generate logging information relating to its operation, and wherein a logging level is configured to determine an amount of logging information generated by the microservice;
   monitoring the execution of the plurality of microservices to determine a failure rate associated with application programming interface (API) calls to the plurality of microservices;
   evaluating one or more rules specifying responses to different failure rates of respective microservices, wherein:
      a first rule specifies increasing a particular logging level associated with a particular microservice in response to a failure rate associated with the particular microservice being above a first threshold; and
      a second rule specifies restarting and/or disabling the particular microservice in response to the failure rate associated with the particular microservice being above a second threshold; and
   based on the evaluation of the one or more rules, altering the logging level.

7. The method of claim 6, wherein the information handling system is a hyper-converged infrastructure (HCI) system.

8. The method of claim 6, further comprising altering the logging level based on a user request for a manual logging level alteration.

9. The method of claim 6, wherein:
   a first logging level corresponds to logging of errors;
   a second logging level corresponds to logging of errors and warnings; and
   a third logging level corresponds to logging of errors, warnings, and events.

10. The method of claim 6, further comprising altering the logging level based on a hardware status of the information handling system.

11. An article of manufacture comprising a non-transitory, computer-readable medium having computer-executable instructions thereon that are executable by a processor of an information handling system for:
   executing a plurality of microservices, wherein each microservice is configured to generate logging information relating to its operation, and wherein a logging level is configured to determine an amount of logging information generated by the microservice;

monitoring the execution of the plurality of microservices to determine a failure rate associated with application programming interface (API) calls to the plurality of microservices;

evaluating one or more rules specifying responses to different failure rates of respective microservices, wherein:
- a first rule specifies increasing a particular logging level associated with a particular microservice in response to a failure rate associated with the particular microservice being above a first threshold; and
- a second rule specifies restarting and/or disabling the particular microservice in response to the failure rate associated with the particular microservice being above a second threshold; and based on the evaluation of the one or more rules, altering the logging level.

12. The article of claim 11, wherein the information handling system is a hyper-converged infrastructure (HCI) system.

13. The article of claim 11, wherein the instructions are further executable for:
- altering the logging level based on a user request for a manual logging level alteration.

14. The article of claim 11, wherein:
- a first logging level corresponds to logging of errors;
- a second logging level corresponds to logging of errors and warnings; and
- a third logging level corresponds to logging of errors, warnings, and events.

15. The article of claim 11, wherein the instructions are further executable for altering the logging level based on a hardware status of the information handling system.

* * * * *